United States Patent [19]

Holbrook

[11] Patent Number: 4,969,859

[45] Date of Patent: Nov. 13, 1990

[54] BELT TENSIONING APPARATUS

[75] Inventor: Russell W. Holbrook, Middlebury, Conn.

[73] Assignee: Pitney Bowes Inc., Stamford, Conn.

[21] Appl. No.: 427,217

[22] Filed: Oct. 24, 1989

[51] Int. Cl.$^5$ .............................................. F16H 7/08
[52] U.S. Cl. .................................................... 474/138
[58] Field of Search ............... 474/101, 109, 136, 138, 474/113, 115, 117, 118, 139, 121, 111, 133, 135; 267/174; 198/814

[56] References Cited

U.S. PATENT DOCUMENTS

| 263,399 | 8/1882 | Gardner | 474/136 |
|---|---|---|---|
| 675,196 | 5/1901 | Colahan | 198/814 |
| 1,374,643 | 4/1921 | Fischbach | 474/138 |
| 1,582,323 | 4/1926 | Warren | 474/138 |
| 2,341,273 | 2/1944 | Helberg | 474/138 |
| 4,758,207 | 7/1988 | Jepson | 474/101 |

FOREIGN PATENT DOCUMENTS 261433  11/1926  United Kingdom ................ 198/814

Primary Examiner—Thuy M. Bui
Attorney, Agent, or Firm—Charles G. Parks, Jr.; David E. Pitchenik; Melvin J. Scolnick

[57] ABSTRACT

The belt tensioning apparatus is comprised of a generally elongated housing having a first section and a second section. The second sections includes a lengthwise slot formed therein. A slide member having a roller rotatively mounted at one end and a tab formed at the other end is slidably mounted in the housing such that the slide member tab is located in said slot. A spring is mounted in the housing second section for applying a biasing force on the tab.

1 Claim, 2 Drawing Sheets

BELT TENSIONING APPARATUS

BACKGROUND OF THE INVENTION

The present invention relates to a tensioning apparatus for maintaining tension on an endless belt.

It is an object of the present invention to present a belt tensioning apparatus featuring simple and inexpensive construction for applying a tension load to an endless belt arrangement.

The belt tensioning apparatus is of two piece construction formed from molded plastic, in the preferred embodiment. The belt tensioning apparatus is comprised of a housing section having an open bottom portion formed at one end and a welled section formed at the other end. A slide member which includes a tab portion is slidably mounted to the housing section such that the tab portion extends within a slot formed in the open bottom section. The slide member includes a rotatably mounted roller at the other end. A spring is preloaded in the open bottom housing section. The spring is loaded either in tension or compression and mounted to act on the slide member tab. The roller of the slide member tab pushes on the belt to cause tensioning. The housing well section end side member include an aligned a slot. A screw extends through the aligned slots to lodge within a supporting wall such that the screw does not interfere with the sliding motion of the slide member.

DETAILED DESCRIPTION OF THE PREFERRED EMBODIMENT

Figure 1:
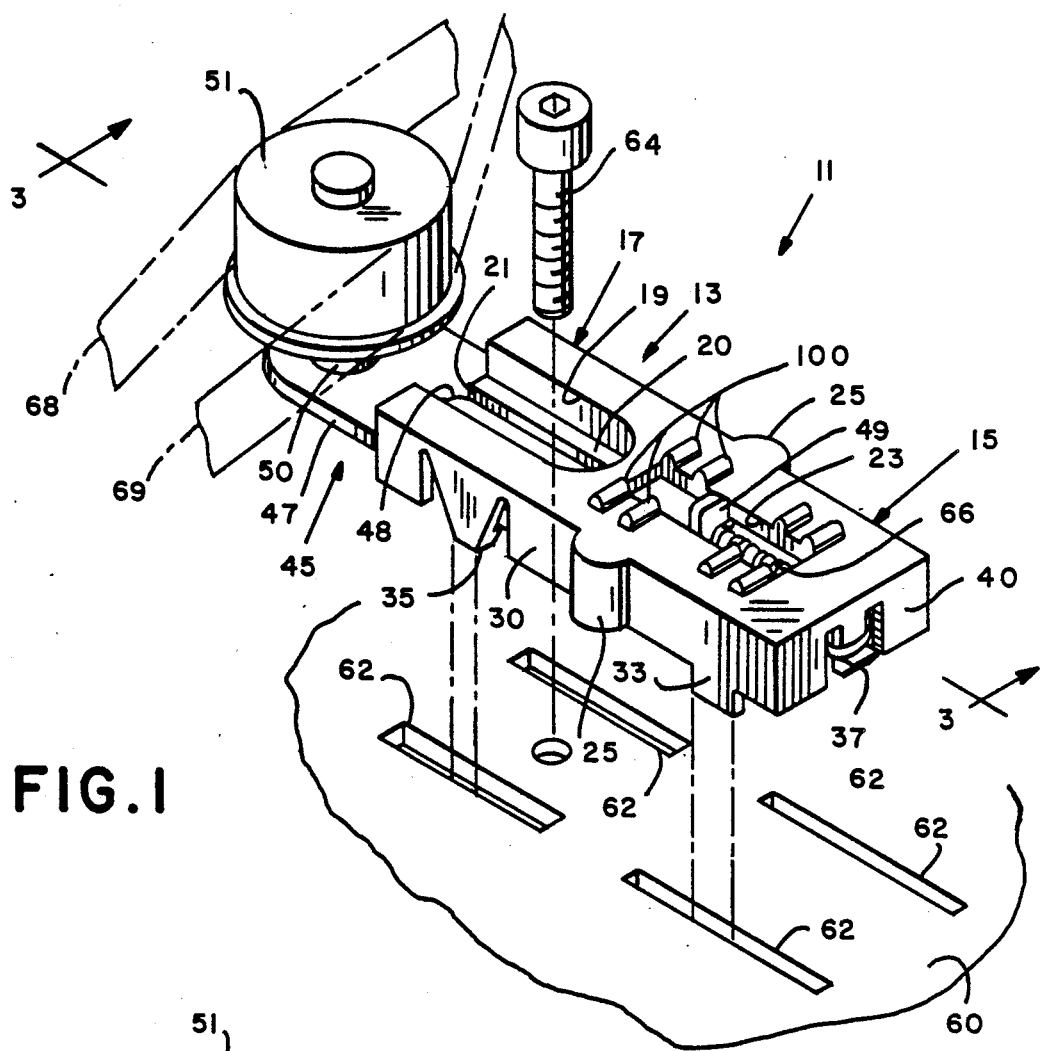
FIG. 1 is an exploited view of the belt tensioning apparatus in accordance with the present invention.
Figure 2:
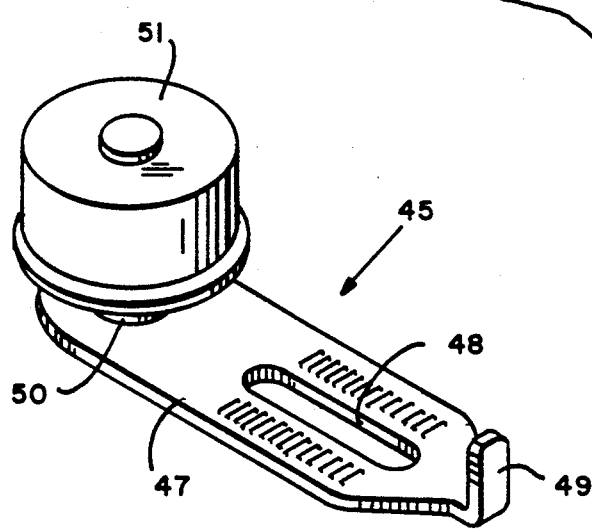
FIG. 2 is a perspective view of the slide member in accordance with the present invention.
Figure 3:
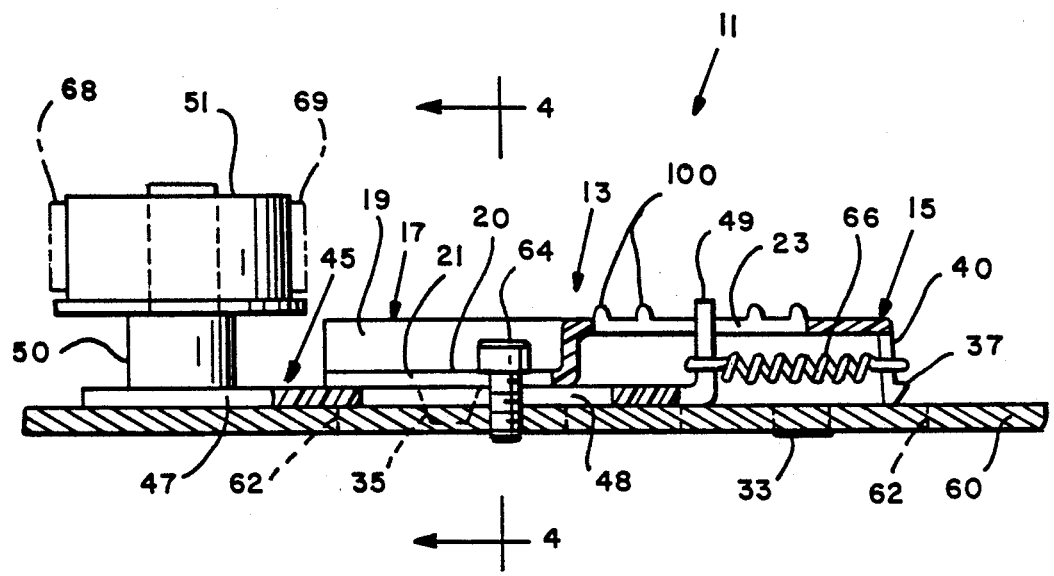
FIG. 3 is a side sectional view of the belt tensioning apparatus.
Figure 4:
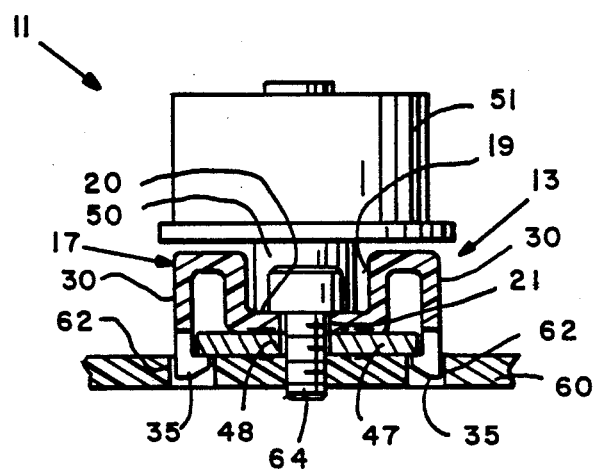
FIG. 4 is a sectional end view of the belt tensioning apparatus.

Referring to the figures, the belt tension apparatus, generally indicated as 11, is comprised of a elongated housing section 13 having an open bottom section 15 at one end and a formed well section 17 at the other end. The section 15 has formed therein a slot 23 and a plurality of finger grip tabs 25 formed to either side of the side walls 30 of the housing 13. Also formed to side walls 30 are guide tabs 33 and L-clip tabs 35. A tab 37 is also formed at the end wall 40 of the housing section 15. The well section 17 includes a well 19 having a slot 21 formed along the well wall 20.

A slide member 45 which includes a slide plate 47. Formed at one end of the slide plate 47 is a tab 49 which holds spring 66 and also acts as a tension indicator. Correct belt tension is confirmed when the tab 49 which extends through housing 15 lines up with indicator mark (100) specified. At the other end is a hub 50. Rotatably mounted on the hub 50 is a rim roller 51.

The slide plate 47 is slidably received in the housing section 13 such that the slide plate 47 is captured between the L-clip tabs 35. The slide member 49 is received in the slot 23. A mounting base 60 is adapted to receive the belt tension apparatus 11 by having a plurality of slots 62 formed therein. The apparatus is then positioned such that the tabs 33 are received in mating slots 62 and the L-clip tabs 35 are received in respective mating slots 62 formed in the base 60. A bolt 64 is then extended through the slot 21 and slot 48 formed in slide plate 47 to threadably engage the base 60 securing the tension apparatus to the base.

A spring 66 is attached at one end to the tab 37 and the other end to the slide plate tab 49 such that if the spring 66 in compression, it pushes the slide plate 45 outwardly causing the roller 51 to bear against the belt 68. If the spring 66 is in tension, the slide plate 45 is pulled inward causing the roller 51 to bear against the tension belt 69.

It is observed now that the tension apparatus offers the benefit of flexibility and if formed in a molded plastic cost and ease of construction.

What is claimed is:

1. A belt tensioning apparatus, comprising:
   a generally elongated housing having a first section and a second section, said first section having a slot well formed therein and said second section having a lengthwise slot formed therein;
   a slide member having a roller rotatively mounted at one end and a tab for at the other end, said slide member being slidably mounted in said housing such that said tab is located in said slot of said second section;
   spring biasing means detachably mounted in said housing second section for applying a biasing force on said tab;
   means for attaching said belt tensioning apparatus to a base such that a threaded bolt can extend through said slot in said first housing section and a slot in said slide member to threadably engage said base; and
   means for visually indicating biasing force level.

* * * * *